(No Model.)
J. G. MOOMY.
PNEUMATIC TIRE.
No. 516,830. Patented Mar. 20, 1894.
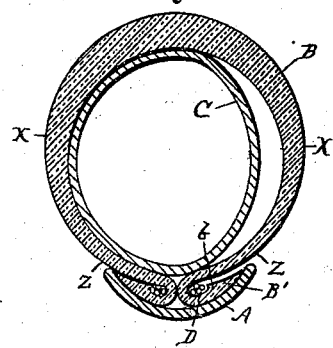
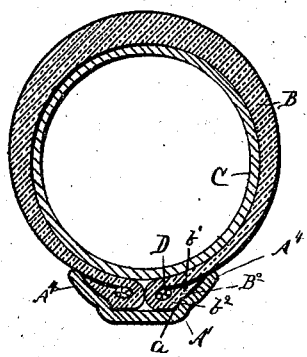
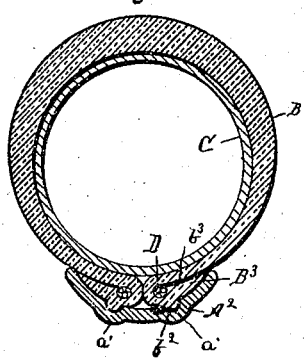
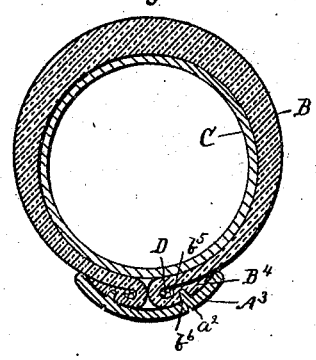
Witnesses
Wm Marks Jr.
H. C. Lord
Inventor
Joseph J. Moomy.
By Attorney
Hallock & Hallock

UNITED STATES PATENT OFFICE.

JOSEPH G. MOOMY, OF ERIE, PENNSYLVANIA.

PNEUMATIC TIRE.

SPECIFICATION forming part of Letters Patent No. 516,830, dated March 20, 1894.

Application filed November 20, 1893. Serial No. 491,462. (No model.)

*To all whom it may concern:*

Be it known that I, JOSEPH G. MOOMY, a citizen of the United States, residing at Erie, in the county of Erie and State of Pennsylvania, have invented certain new and useful Improvements in Pneumatic Tires; and I do hereby declare the following to be a full, clear, and exact description of the invention, such as will enable others skilled in the art to which it appertains to make and use the same.

This invention relates to pneumatic tires and consists in certain improvements in the construction thereof as will be hereinafter described and pointed out in the claims.

More particularly the invention relates to that class of pneumatic tires having flaps that contact the rim of the wheel on which are placed binders which bind them to said rim thus holding the tire in place.

The invention is illustrated in the accompanying drawings as follows:

Figure 1 shows a transverse section of a tire and rim made in accordance with my invention. Fig. 2 shows a like view of a tire having features additional to those shown in Fig. 1. Figs. 3 and 4 are like views showing constructions alternative to Fig. 2.

B marks the tire casing; C the air tube; D the binder; and in Fig. 1, A the rim of the wheel.

Where the casing is circumferentially complete in cross section, the pressure incident to the inflation of the tire is, of course, sustained entirely by the casing; and the only strain on the binder is caused by the running of the wheel independent of the air pressure. But as it is difficult to keep this class of tire in repair, a large variety of tires are made with their inner peripheries open longitudinally as shown in the drawings so that when the binder is removed, the casing may be readily removed, exposing the inner air tube, and when this tire is used, some provision must be made to sustain the transverse circumferential pressure on the tire incident to its inflation. This is accomplished in some by the binder, in others by the rim, as in what is known as the clinchers; and in others by the binder and rim combined.

Where the binder is used it is desirable that the strain on it be as light as possible in order that the binder may be correspondingly light and its fastening more readily accomplished. Wherever the binder is placed, with reference to the transverse circumference, the pressure on it must of course be in the direction of the arc of the tire at that point: For example: If the binders were placed at the points X—X (shown in Fig. 1) the direction of the arcs of the tire at those points being in line with the plane of the binder annulus, the pressure incident to inflation would be exerted on the binders in line of the planes of their annulus, and would therefore be sustained entirely by the binders themselves.

In all the tires with which I am acquainted wherein binders are used on outwardly turned flaps to bind the tire to the rim, the binders are placed on flaps that rest on the rim at its outer edges. (As shown at Z—Z in Fig. 1.) The angles of the arcs of the tire to the annuli of the binders at these points are not sufficient to relieve the binders from receiving nearly the entire strain incident to the inflation of the tire.

In my construction the flaps are placed nearly at the center of the rim so that the direction of the arc of the tire at the point bound is practically at a right angle to the plane of the binder annulus. By so placing the binder the frictional contact of the flaps on the rim sustains a large percentage of the inflation strain. If the dish of the rim is deeper or of an arc of less radius than the arc of the tire (as shown in Fig. 1) the inflation strain is directed largely to the sides of the rim, and when a shoulder is added outside the binder, (as shown in Figs. 2, 3, and 4) if the flap is stiff enough not to be easily rolled, the inflation strain on the binder is almost entirely eliminated. In all the drawings the flap is outwardly turned and in Fig. 1 is marked B. On all of these flaps there is an annular rib on their upper side which is marked $b$ in Fig. 1. This rib is to catch the binder and prevent it from being rolled off the flap by the inflation pressure of the tire. This same result may be accomplished by casting the flap very stiff and turned back in the proper position. Such a flap forms the subject of another application and is not here described.

In Fig. 2 the flap is marked $B^2$, the upper annular rib $b'$, and the rim A. The rim is turned up at the sides forming flanges which being at an angle to arc of the tire at those points are in the line of the strain and relieve the binder to a greater extent than those constructions shown in Fig. 1. The lateral movement of the flaps is further obviated by placing the annular groove $a$ in the rim into which the annular rib $b^2$ on the under side of the flap is placed.

In Fig. 3, $A^2$ marks the rim; $B^3$ the flap; and $b^3$ the annular rib on the upper side of the flap. The rim is of the usual concave shape, but having annular grooves or corrugations $a'$ therein into which fit the annular ribs or corrugations $b^4$ on the under sides of the flaps. This groove and rib are outside the binder and receive the strain incident to the tendency of the tire to move in the direction of its arc at that point when inflated.

In Fig. 4, $A^3$ marks the rim; $B^4$ the flaps; and $b^5$ the annular rib on the upper side of the flap. The rim here also is of the usual concave shape, but it has the annular rib $a^2$ extending into the groove $b^6$ in the flap just outside the binder recess and rib $b^5$ on the upper side of the flap. As this rib is much nearer the binder than the flanges $A^4$ in Fig. 2 and the arc of the tire than the annular shoulder extending from the flap into the rim shown in Figs. 2 and 3, it comes more directly in the line of the strain and consequently reduces the strain on the binder to a minimum.

What I claim as new is—

1. In a pneumatic tire, the combination with the rim of the wheel, of the tire having an outwardly turned flap with a binder seat thereon at a point in the transverse circumference of the tire where the direction of the arc of said tire is substantially a right angle to the plane of the binder annulus, and which contacts the rim of said wheel, and a binder on said flap on said seat.

2. In a pneumatic tire the combination with the rim of the wheel having annular corrugations therein, of the tire having an outwardly turned flap with a binder seat thereon at a point in the transverse circumference of the tire, where the direction of the arc is substantially a right angle to the plane of the binder annulus, and having corrugations on the under side thereof outside of the binder that intermesh the corrugations of the rim, and a binder on said flap on said seat.

3. In a pneumatic tire, the combination with the rim of the wheel having an annular rib thereon, of the tire having an outwardly turned flap with a binder seat thereon at a point in the transverse circumference of the tire, where the direction of the arc is substantially a right angle to the plane of the binder annulus and having a groove on the under side thereof outside the binder that fits over the annular rib on the rim, and a binder on said flap on said seat.

In testimony whereof I affix my signature in presence of two witnesses.

JOSEPH G. MOOMY.

Witnesses:
 HENRY A. CLARK,
 H. C. LORD.